Patented Sept. 19, 1939

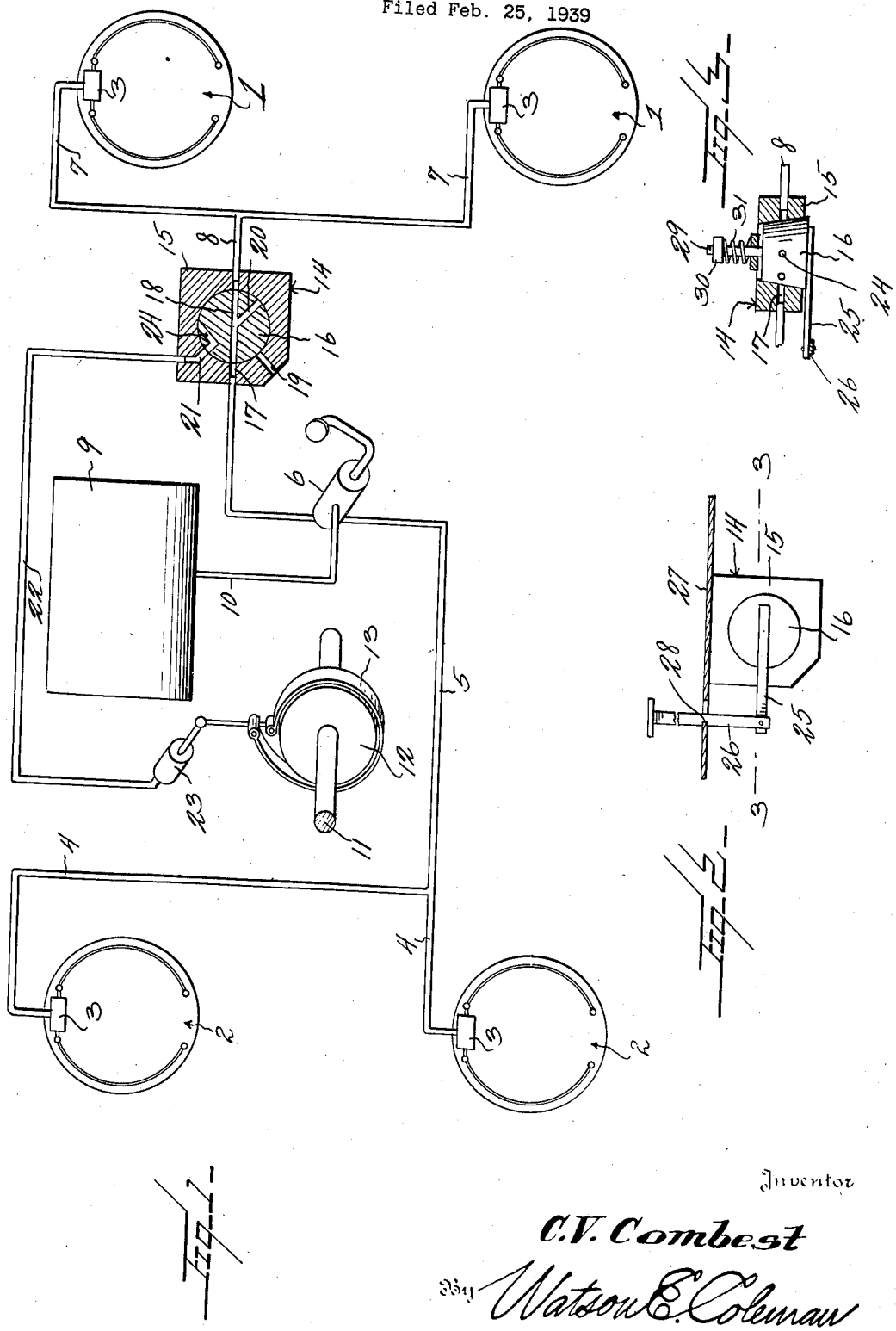

2,173,328

UNITED STATES PATENT OFFICE 2,173,328

VEHICLE BRAKE SYSTEM CONTROL

Clark V. Combest, Flagstaff, Ariz.

Application February 25, 1939, Serial No. 258,548

3 Claims. (Cl. 188—152)

This invention relates to air braking systems for wheeled vehicles and pertains particularly to an improved means of control for certain parts of the system.

The primary object of the present invention is to provide in an air or other type of fluid brake system for vehicles, a means for releasing the brakes of the front wheels while retaining the application of the rear wheel brakes, in the event that a front wheel tire blows out or the vehicle should go into a skid by reason of an uneven application of the brakes to the front wheels, thus enabling the operator to bring his vehicle to a stop without using the front brakes or having to remove his hands from the steering wheel to operate the drive line brake.

Another object of the invention is to provide a means for accomplishing the above described object, in association with means for automatically applying the drive line brake simultaneously with the releasing of the front wheel brakes.

A further object of the invention is to provide in a mechanism of the above described character, a novel valve unit whereby the described results are obtained.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Fig. 1 is a view illustrating diagrammatically the lay-out of an air pressure braking system showing the application of the present invention thereto.

Fig. 2 is a view in side elevation of the improved control valve showing the foot means for actuating the same.

Fig. 3 is a sectional view on the line 3—3 of Fig. 2.

Referring now more particularly to the drawing, Fig. 1 illustrates diagrammatically the working parts of an air brake system of the type employed upon buses and trucks, showing the present improved control valve connected therein. In this system the front wheel brakes are generally indicated at 1 while the rear wheel brakes are indicated at 2. These front and rear wheel brakes are actuated by fluid operators 3 which are conventionally shown and those of the rear brakes are connected through the lines 4 with a main line 5 leading rearwardly from a control or application valve 6. The front wheel brakes have similar operating units which are actuated by the air pressure of the system and which are also indicated by the numeral 3, and these units are connected by the lines 7 with a common line 8 leading also to the application valve 6.

The numeral 9 indicates a source of air or other operating fluid under pressure and this is connected by the line 10 with the application valve 6.

The vehicle drive line or power shaft is indicated at 11 and carries a brake drum 12 which is engaged by a band 13. The parts thus far described constitute standard or well-known parts of a braking system, therefore, they have been merely conventionally illustrated and generally referred to as it is not believed necessary to go into any detailed description of the internal construction of the several units 3 and 6 or particularly describe the operation of the system other than to say that in ordinary operation, the actuation of the control valve 6 by a foot pedal or other suitable means permits air or other compressed fluid to flow from the tank 9 into the lines 5 and 8 so as to apply the brakes on the front and rear pairs of wheels 1 and 2.

In the event that a tire of a front wheel ruptures or the vehicle begins to skid by reason of an unequal application of the front wheel brakes, no means is available for releasing the front wheel brakes without also releasing the rear wheel brakes.

In accordance with the present invention, there is provided a front brake release valve unit which is indicated generally by the numeral 14. This unit comprises a valve body 15 and a rotary plug 16 therein. This valve body 15 is provided with the diametrically opposite alined ports 17 which are connected in the line 8 and the rotary plug 16 is provided with a main passage 18 extending diametrically therethrough whereby the ports 17 may be coupled and air may flow from the valve 6 through the line 8 to the lines 7 leading to the front wheel brake operators. The body 15 of the valve is provided with a discharge passage or port 19 and the plug 16 has a discharge port 20 which is adapted to be brought into register with the port 17 leading to the line 8 upon rotation of the plug to the proper degree. Thus that end of passage 18 remote from port 20 will be connected with the discharge port 19. The body 16 of the valve also has a port 21 which may be termed the drive line control port and this port has connected therewith the air line 22 which leads to a brake actuator unit 23 which is coupled with the drive line brake band 13 so that when air is passed through the line 22 into the unit 23, this unit will operate to apply the brake band 13 to the drum 12.

The plug 16 of the brake release valve is provided with the angular by-pass passage 24 which is so formed that when the valve plug is given approximately an eighth turn in one direction, this by-pass will establish connection between the port 17 nearest the control valve 6 and the line 22, the line 8 meanwhile being broken by this rotary motion of the plug. At the same time that the line 8 is broken and the line 22 is connected with the valve 6 upon rotation of the plug 16 in the manner described, the diametrical passage 18 of the plug will have one end connected with the exhaust port 19 of the valve body and the exhaust passage 20 of the plug will be connected with the side of the line 8 leading to the front wheel brake actuators, thus permitting the air to bleed from these actuators to the atmosphere.

From the foregoing, it will be readily apparent that in an air brake operated system constructed in accordance with the present invention, should it become necessary for the driver to release the front wheel brakes without releasing the rear wheel brakes, this can be readily accomplished by means of the valve 14 and simultaneously the driver can apply the drive line brake 13 so as to have the advantage of this additional braking action for checking the movement of the vehicle.

The brake release valve 14 may be placed in any suitable position where it may be easily reached by the driver's foot, this valve being provided with the actuator arm 25 which is connected with one side of the tapered rotary plug 16 and the free end of this arm being connected with a foot lever 26 which may pass upwardly through the floor of the vehicle as indicated at 27, so that the driver may use his foot for releasing the foot lever from its connection with the floor, which connection is indicated at 28, to enable him to press down upon the lever 25 to oscillate the plug. In order that the valve plug 16 may be held tightly seated, it is provided at its reduced end with a threaded stem 29 which carries a nut 30 and between this nut and the adjacent wall of the valve casing 15, a spring 31 is interposed which constantly tends to draw the valve plug onto its seat.

From the foregoing it will be readily apparent that the valve 14 while providing a convenient means for releasing the front wheel brakes, does not interfere in any manner with the ordinary operation of the drive line brake as it will be obvious that the usual manual connections with this latter brake may be made. It will be also apparent that by the use of the improved control means the front wheel brakes may be entirely cut off from the braking system when driving on slippery roads at which time it is desirable that such front brakes be maintained inoperative while the other brakes are employed, so that a better control of the vehicle may be had.

What is claimed is:

1. In a braking system for vehicles having front and rear pairs of wheels, air operated braking means for each pair of wheels, a source of air under pressure and an application valve controlling flow of air to the braking means, valve means interposed between said application valve and the front wheel braking means for relieving the air pressure on the front wheel braking means, a drive line brake, and means controlled by said valve means for setting the drive line brake simultaneously with the relieving of the air pressure on the front wheel braking means.

2. In a braking system for vehicles having front and rear pairs of wheels, air operated braking means for each pair of wheels, a source of air under pressure and an application valve controlling the flow of air to said braking means; a brake release valve between said application valve and the front wheel braking means for relieving the latter, a drive line for the vehicle, an air pressure set brake working on said drive line, and means controlled by said release valve to couple the air pressure source with said air pressure set brake simultaneously with the relief of the front wheel brakes.

3. In a braking system for vehicles having front and rear pairs of wheels, air operated braking means for each pair of wheels, a source of air under pressure and an application valve controlling the flow of air to said braking means; a valve between said application valve and the front wheel braking means having a rotary plug and ports in said plug and in the body of the valve carrying the plug, one of the ports in the body of the valve being connected with said application valve and another of the ports being connected with the front wheel braking means, a drive line for the vehicle, an air pressure set brake working on said drive line, a third port of said valve casing being connected with the drive line brake, the casing having a fourth port opening to the atmosphere, and said rotary plug having ports therein which are so constructed and arranged that upon rotating the plug to a predetermined position, the air pressure from the front wheel braking means will be vented through said last-mentioned casing port, and communication will be established between the port connected with the application valve and the port connected with the drive line brake.

CLARK V. COMBEST.